US012335093B2

(12) United States Patent
Chitrigi Ganesh et al.

(10) Patent No.: US 12,335,093 B2
(45) Date of Patent: *Jun. 17, 2025

(54) ORCHESTRATED RECONNECT FOR CLIENT-UNAWARE ROLLING OF NETWORK NODES

(71) Applicant: Cisco Technology, Inc., San Jose, CA (US)

(72) Inventors: Pankaj Chitrigi Ganesh, Arlington, MA (US); Kyle Andrew Donald Mestery, Woodbury, MN (US); Danxiang Li, Arlington, MA (US); Rahim Lalani, Vancouver (CA); Andrzej Konrad Kielbasinski, Grafton, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,459

(22) Filed: Mar. 28, 2024

(65) Prior Publication Data
US 2024/0243971 A1    Jul. 18, 2024

Related U.S. Application Data

(63) Continuation of application No. 17/462,781, filed on Aug. 31, 2021, now Pat. No. 11,979,284.

(51) Int. Cl.
*H04L 41/082* (2022.01)
*H04L 12/46* (2006.01)
(Continued)

(52) U.S. Cl.
CPC ........ *H04L 41/082* (2013.01); *H04L 12/4675* (2013.01); *H04L 45/22* (2013.01); *H04L 67/1031* (2013.01); *H04L 67/563* (2022.05)

(58) Field of Classification Search
CPC .. H04L 41/082; H04L 67/563; H04L 67/1031
See application file for complete search history.

(56) References Cited

U.S. PATENT DOCUMENTS 7,673,048 B1 * 3/2010 O'Toole, Jr. ........ H04L 12/4633
709/227
7,885,184 B2    2/2011 George et al.
(Continued)

FOREIGN PATENT DOCUMENTS

WO    WO2006004461 A1    1/2006

OTHER PUBLICATIONS

PCT Search Report and Written Opinion mailed Nov. 16, 2022 for PCT Application No. PCT/US22/41054, 28 pages.
(Continued)

*Primary Examiner* — Viet D Vu
(74) *Attorney, Agent, or Firm* — Lee & Hayes, P.C.

(57) ABSTRACT

Techniques for the transparent rolling of nodes in a cloud-delivered headend service without disrupting client traffic or making users aware of the various nodes in the system being rolled are described herein. The techniques may include receiving an indication that a first node of a network is to be rolled. Based at least in part on the indication, new connection requests may not be sent to the first intermediate node. Additionally, a client device having an existing connection through the first node may be identified. In some examples, a request may be sent to the client device to prompt the client device to establish a new connection. After determining that the new connection has been established such that the new connection flows through a second node of the network, the first node may be rolled.

22 Claims, 12 Drawing Sheets

(51) Int. Cl.
*H04L 45/00* (2022.01)
*H04L 67/1031* (2022.01)
*H04L 67/563* (2022.01)

(56) References Cited

U.S. PATENT DOCUMENTS

| | | |
|---|---|---|
| 9,253,123 B1 | 2/2016 | Podge |
| 10,257,167 B1 | 4/2019 | Matthews et al. |
| 2004/0049573 A1 | 3/2004 | Olmstead |
| 2006/0235972 A1 | 10/2006 | Asnis |
| 2008/0046995 A1 | 2/2008 | Satterlee et al. |
| 2008/0056272 A1 | 3/2008 | Batta |
| 2009/0037367 A1 | 2/2009 | Wein |
| 2014/0189132 A1 | 7/2014 | Suganthi et al. |
| 2014/0372504 A1 | 12/2014 | Ben Dror et al. |
| 2015/0372982 A1 | 12/2015 | Herle et al. |
| 2016/0212098 A1* | 7/2016 | Roch ............... H04L 63/029 |
| 2017/0171156 A1 | 6/2017 | Schultz |
| 2019/0034210 A1 | 1/2019 | Palladino |
| 2019/0075083 A1 | 3/2019 | Mayya et al. |
| 2021/0136040 A1 | 5/2021 | Mestery et al. |
| 2021/0194986 A1 | 6/2021 | Shribman et al. |
| 2022/0094751 A1 | 3/2022 | Szczesniak et al. |

OTHER PUBLICATIONS

Office Action for U.S. Appl. No. 17/462,781, mailed on Sep. 29, 2023, Ganesh, "Orchestrated Reconnect for Client-Unaware Rolling of Network Nodes", 11 Pages.

Office Action for U.S. Appl. No. 17/462,781, mailed on Nov. 28, 2022, Ganesh, "Orchestrated Reconnect for Client-Unaware Rolling of Network Nodes", 6 pages.

Office Action for U.S. Appl. No. 17/462,781, mailed on Jun. 14, 2023, Inventor #1 Pankaj Chitrigi Ganesh, "Orchestrated Reconnect for Client-Unaware Rolling of Network Nodes," 6 pages.

* cited by examiner

US 12,335,093 B2

ORCHESTRATED RECONNECT FOR CLIENT-UNAWARE ROLLING OF NETWORK NODES

RELATED APPLICATIONS

This patent application is a continuation of and claims priority to U.S. patent application Ser. No. 17/462,781, filed Aug. 31, 2021, which is fully incorporated herein by reference.

TECHNICAL FIELD

The present disclosure relates generally to techniques for the transparent rolling of nodes in a cloud-delivered headend service without disrupting client traffic or making users aware of the various nodes in the system being redeployed or taken out of service.

BACKGROUND

Generally, cloud-based, virtual private network (VPN) headend services are built using software at all layers to make the system horizontally scalable, as well as redundant to individual node failures. However, in terms of scaling the native software solution, network and system administrators are faced with choices on how each node of the system should be scaled separately. On top of scaling each component, network administrators must also understand how to roll new code out to each component without affecting the users of the system.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
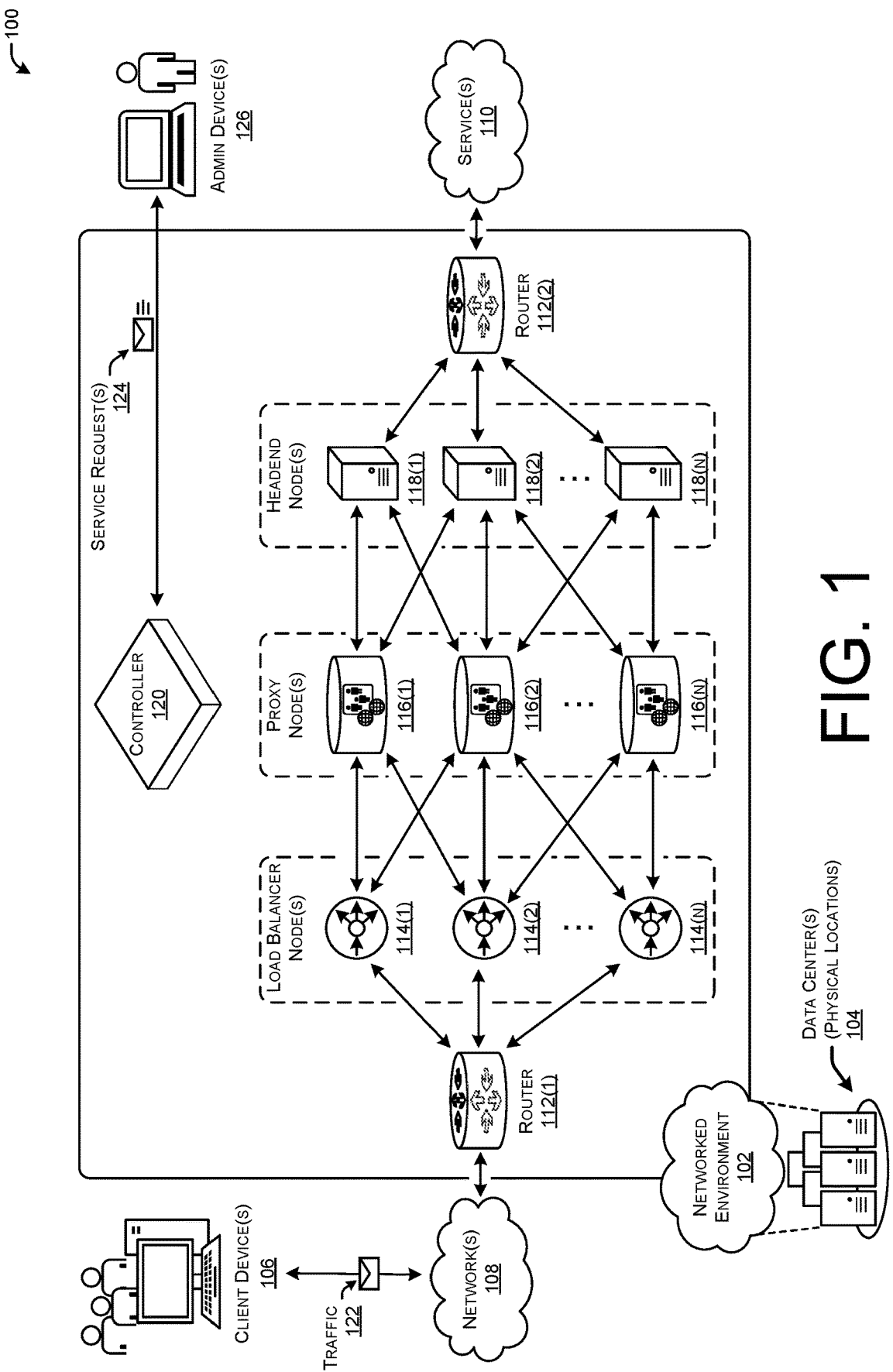
FIG. 1 illustrates a schematic view of an example architecture including a networked environment that may be used to carry out some of the orchestrated reconnect techniques described in this disclosure. The example networked environment may be representative of a cloud-based, virtual private network headend service.

This disclosure describes systems and methods that, among other things, provides for the transparent rolling of nodes in a cloud-delivered headend service without disrupting client traffic or making users aware of the various nodes in the system being redeployed or taken out of service. By way of example, and not limitation, a method according to the various techniques described in this disclosure may include receiving an indication that a first intermediate node (e.g., load balancer node, proxy node, headend node, etc.) of a network is to be removed from service. Based at least in part on the indication, the method may include refraining from sending new connection requests to the first intermediate node, as well as, in some instances, identifying a client device having an existing connection through the first intermediate node. The method may also include sending a request to the client device to prompt the client device to establish a new connection. In some instances, after determining that the new connection has been established such that the new connection flows through a second intermediate node of the network, the first intermediate node may be removed from service.

Additionally, the techniques described herein may be performed as a method and/or by a system having non-transitory computer-readable media storing computer-executable instructions that, when executed by one or more processors, performs the techniques described herein.

Example Embodiments

As discussed above, cloud-based, virtual private network (VPN) headend services are generally built using software at all layers to make the system horizontally scalable, as well as redundant to individual node failures. However, in terms of scaling the native software solution, network and system administrators are faced with choices on how each node of the system should be scaled separately. On top of scaling each component, network administrators must also understand how to roll new code out to each component without affecting the users of the system.

Accordingly, this disclosure describes technologies that allow for the rolling (e.g., upgrade, maintenance, etc.) of deployed nodes in a cloud-based VPN solution without affecting connected users. By using "Orchestrated Reconnect" techniques, which allow VPN headend nodes to signal to clients to reconnect by establishing a second tunnel, a load balancer layer may be used to redirect the clients to fresh new nodes in the system, allowing the draining of connections from the old nodes, which can then be shutdown. This allows for the transparent rolling of nodes in, for instance, an SSL cloud-based VPN headend service, without disrupting client traffic or making the user aware of the various nodes in the system being redeployed.

As used herein, to "roll" a node means to remove an existing node from service and replace it with a new node. In some examples, a node may be rolled in order to perform a software update. In such a scenario, an old node with old software may be removed from service and replaced with a new node (or a new version of the old node) having updated or different software. In some examples, a node may be rolled to simply take a node out of service (e.g., to minimize the total amount of nodes active in the system).

In some examples, a network architecture of a datacenter may include a layer of load balancers, a layer of proxy nodes (e.g., nodes that proxy TLS and DTLS traffic), and a layer of headend nodes. As packets come into the datacenter, they may be distributed to the load balancers, then ECMP routed to the proxy nodes, and then sent to the headend nodes. As such, in some of the examples disclosed herein for rolling a headend node (e.g., SSL server, DTLS server, remote access gateway, VPN terminator, etc.), the specific headend node may be taken out of the configuration backend on each proxy node by signaling to a controller of the network. This means new connections may not be sent from the proxy nodes to this specific headend node, however existing connections remain unaffected. On the specific headend node that is to be rolled, a reconnect request may be sent to each client connected locally, and as the clients reconnect, the proxy nodes may send the reconnect requests (e.g., TLS and DTLS connections) to different headend nodes on the backend. Once the client has the new connection established, the client may remove the old tunnel. Additionally, once the specific headend node is drained of all its client connections, the specific headend node can be rolled by taking it down and deploying a new headend node.

As another example of rolling a proxy node, the specific proxy node may be taken out of rotation by signaling the load balancers through the controller. This tells the load balancers to remove the specific proxy node from their configurations, and new connections may not be sent to the specific proxy node, however connections may not be affected. On all of the headend nodes, it is determined which clients are going through the specific proxy node based at least in part on the proxy protocol added to the initial TLS and DTLS packet from the proxy node to the headend node, meaning we know which clients come from which proxy node. Once all the clients are identified, those clients are signaled to reconnect. As the clients reconnect, the load balancer nodes may skip the specific proxy node that was taken out of rotation. Once the client has a new connection (e.g., TLS and DTLS tunnels) established, the client may remove the old tunnel connection. Additionally, once the specific proxy node is drained of clients, it can be rolled by taking it down and deploying a new proxy node.

The benefits of the orchestrated reconnect techniques described herein are, among other things, the ability to transparently handle deploying new intermediate nodes (e.g., load balancers, proxy nodes, headend nodes, etc.) without customers seeing a drop in connection since the client will build a parallel tunnel and tear the old one down. Additionally, because the orchestrated reconnect is sent from the headend node to the client, the techniques disclosed herein also allow for the movement of clients to different datacenters. For instance, when the reconnect request is sent, the request may indicate a new DNS address to use, which could cause the clients to move to a new IP address as returned by the resolvers. As such, if the DNS name is mapped to each datacenter of the system, this allows for traffic to be rebalanced across datacenters. Other benefits and improvements in computer-related technology not explicitly noted will be apparent to those having ordinary skill in the art.

By way of example, and not limitation, a method according to the techniques described herein may include receiving an indication that a first intermediate node of a network is to be rolled. In some examples, the network may include a cloud-based VPN headend service that includes multiple VPN headend nodes that manage connections to computing resources (e.g., the internet, virtual machines, processing, memory, etc.). In some instances, the intermediate node may be a load balancer node, a proxy node (e.g., proxy server or node that proxies TLS and/or DTLS traffic, etc.), a headend node (e.g., SSL server, DTLS server, remote access gateway, VPN terminator, etc.), and/or the like. The intermediate node may be topologically disposed in the network between a first node/device (e.g., first datacenter edge router) of the network and a second node/device (e.g., second datacenter edge router) of the network. In at least one example, the indication is received at a controller of the network that facilitates the rolling of the first intermediate node.

In some examples, the network may refrain from sending new connection requests to the first intermediate node. For instance, based at least in part on the indication, the controller may cause one or more other intermediate nodes of the network to refrain from sending new connection requests to the first intermediate node by removing the first intermediate node from a configuration or routing table of the other intermediate nodes. For instance, if the first intermediate node is a headend node, the controller may remove the headend node from the configuration of the proxy nodes. Additionally, or alternatively, if the first intermediate node is a proxy node, the controller may remove the proxy node form the configuration of the load balancer nodes. In this way, the new connection requests may be "steered around" the first intermediate node to a second intermediate node, while traffic of existing connections may still be sent to the first intermediate node.

In some examples, a client device having an existing connection with the first intermediate node may be identified. For instance, the client device may be identified in response to receiving the indication that the first intermediate node is to be rolled. In some examples, multiple client devices may be identified as the first intermediate node may be servicing connections for multiple client devices. In some examples, the method may include sending a request to the client device to prompt the client device to establish a new connection. For instance, the headend node that the client device is connected to may send the reconnect request. Additionally, the reconnect request may be sent to multiple client devices based on how many client devices are connected to the headend node.

In some examples, the method may include determining that the new connection has been established such that the new connection flows through a second intermediate node of the network. The second intermediate node of the network may be different than the first intermediate node. In some examples, the second intermediate node of the network may be associated with a same DNS address or hostname as the first intermediate node. Based at least in part on determining that the new connection has been established, the first intermediate node may be rolled. In some examples, removing the first intermediate node from service may further be based at least in part on determining that each one of the multiple client devices have established new connections through other intermediate nodes of the network that are different from the first intermediate node. Additionally, or alternatively, rolling the first intermediate node may further be based at least in part on the client device removing the old connection (e.g., old tunnel) from its configuration.

In some examples, rolling the first intermediate node may include removing the first intermediate node from service, updating the first intermediate node with a new version of software while the first intermediate node is removed from service, and then bringing the first intermediate node back online. Additionally, or alternatively, rolling the first intermediate node may include deploying a new intermediate node to replace the first intermediate node based at least in part on the first intermediate node being removed from service. The new intermediate node may have an updated version of software compared to the first intermediate node, in some examples.

In some examples, the first intermediate node may be associated with a first datacenter and the second intermediate node may be associated with a second datacenter. In some instance, the second datacenter may be located in a different geographical location than the first datacenter. That is, the connection of the client device may be migrated from a first datacenter in a first geographic location to a second datacenter in a second geographic location using the techniques described herein. This may balance the resource load of the datacenters at each location, move the client to a closer datacenter to reduce latency, and the like.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic view of an example architecture 100 including a networked environment 102 that may be used to carry out some of the orchestrated reconnect techniques described in this disclosure. The example networked environment 102 may be representative of a cloud-based, VPN headend service.

Generally, the networked environment 102 may include devices that are housed or located in one or more data centers 104 that may be located at different physical locations. For instance, the networked environment 102 may be supported by networks of devices in a public cloud computing platform, a private/enterprise computing platform, and/or any combination thereof. The one or more data centers 104 may be physical facilities or buildings located across geographic areas that are designated to store networked devices that are part of the networked environment 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the networked environment 102 may not be located in explicitly defined data centers 104 and, rather, may be located in other locations or buildings.

The networked environment 102 may be accessible to client devices 106 over one or more networks 108. The networked environment 102, and the networks 108, may each respectively include one or more networks implemented by any viable communication technology, such as wired and/or wireless modalities and/or technologies. The networked environment 102 and networks 108 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Virtual Private Networks (VPNs), Wide Area Networks (WANs)—both centralized and/or distributed—and/or any combination, permutation, and/or aggregation thereof. The networked environment 102 may include devices, virtual resources, or other nodes that relay packets from one network segment to another by nodes in the computer network.

In some examples, the networked environment 102 may provide, host, provide connectivity to, or otherwise support one or more services 110 for client devices 106 to connect to and use, such as the internet. The client devices 106 may comprise any type of device configured to communicate using various communication protocols (e.g., SSL, TLS, DTLS, and/or any other protocol) over the networks 108. For instance, the client device 106 may comprise a personal user device (e.g., desktop computers, laptop computers, phones, tablets, wearable devices, entertainment devices such as televisions, etc.), network devices (e.g., servers, routers, switches, access points, etc.), and/or any other type of physical or logical computing device. The client devices 106 may include one or more VPN clients.

In some examples, the networked environment 102 may include routers 112(1) and 112(2), load balancer nodes 114(1)-114(N), proxy nodes 116(1)-116(N), headend nodes 118(1)-118(N), and a controller 120. In some examples, the routers 112 may be edge routers of the data center 104 that perform basic packet ingress and egress. The edge routers 112, the load balancers 114, and/or the proxy nodes 116 may use equal-cost multipath routing (ECMP), which is a strategy where next-hop packet forwarding to a single destination can occur over multiple "best paths" which tie for top place in routing metric calculations. Further, any routing strategy may be used by the edge routers 112, the load balancers 114, or the proxy nodes 116, such as Open Shortest Path First (OSPF), Intermediate System to Intermediate System (ISIS), Enhanced Interior Gateway Routing Protocol (EIGRP), and/or Border Gateway Protocol (BGP) in conjunction with ECMP routing. The edge routers 112 may in some instances, balance traffic 122 based on a hash of a network 5-tuple in order to route packets to the load balancers 114. The traffic 122 may include TLS and/or DTLS traffic.

The load balancer nodes 114(1)-114(N) may be horizontally scalable within the networked environment such that "N" represents any number of load balancer nodes that is greater than or equal to one. Similarly, the proxy nodes 116(1)-116(N) and the headend nodes 118(1)-118(N) may also be horizontally scalable as well based on network requirements or usage. In at least one example, the proxy nodes 116 proxy TLS and DTLS traffic. For instance, the proxy nodes 116 may proxy traffic to the headend devices 118 based on a server name indicator (SNI) value in the Client Hello message, which is sent by the client as part of establishing a TLS or DTLS connection. In some examples, using ECMP routing on the load balancers 114 may allow the load balancer to direct and "pin" specific client flows to specific proxy nodes 116. In some examples, the headend nodes 118 may represent TLS servers, DTLS servers, VPN terminator nodes, remote access gateways, and/or the like. As illustrated in FIG. 1, any of the load balancer nodes 114 are capable of sending traffic 122 to any of the proxy nodes 116, and any of the proxy nodes 116 are capable of sending traffic 122 to any of the headend nodes 118. Additionally, the load balancer nodes 114, proxy nodes 116, and headend nodes 118 may be referred to in some examples herein as "intermediate nodes" because they are disposed between the edge routers 112(1) and 112(2) within the networked environment 102/datacenter 104.

In some examples, the controller 120 may receive service requests 124 from one or more connected admin devices 126. The service requests 124 may indicate that an intermediate node (e.g., load balancer node 1114, proxy node 116, or headend node 118) of the networked environment 102/datacenter 104 is to be rolled. Based on the controller 120 receiving a service request 124 that indicates a specific intermediate node is to be rolled, the controller 120, may cause the load balancer nodes 114 or the proxy nodes 116 to refrain from sending new connection requests to the specific intermediate node. For instance, the controller may cause the load balancer nodes 114 or the proxy nodes 116 to refrain from sending new connection requests to the specific intermediate node by removing the specific intermediate node from a configuration or routing table of the load balancer nodes 114 and/or the proxy nodes 116. In this way, new connection requests sent in response to an orchestrated reconnect may be "steered around" the specific intermediate node to an alternate intermediate node, while traffic of existing connections may still be sent to the specific intermediate node.

Although depicted in FIG. 1 as separate hardware components, it should be understood that the edge routers 112, the load balancers 114, the proxy nodes 116, the headend nodes 118, and/or the controller 124 may be software components at least partially residing in memory. In this way, one or more processors may execute instructions that cause the one or more processors to perform all of the operations described herein with respect to the edge routers 112, the load balancers 114, the proxy nodes 116, the headend nodes 118, and/or the controller 124. In some instances, the edge routers 112, the load balancers 114, the proxy nodes 116, the headend nodes 118, and/or the controller 124 may be individual hardware components and/or software components that reside in a standalone device or a system of standalone devices. Additionally, or alternatively, the edge routers 112, the load balancers 114, the proxy nodes 116, the headend nodes 118, and/or the controller 124 may include any type of networking device, such as servers, switches, routers, hubs, bridges, gateways, modems, repeaters, access points, etc.

Figure 2A:
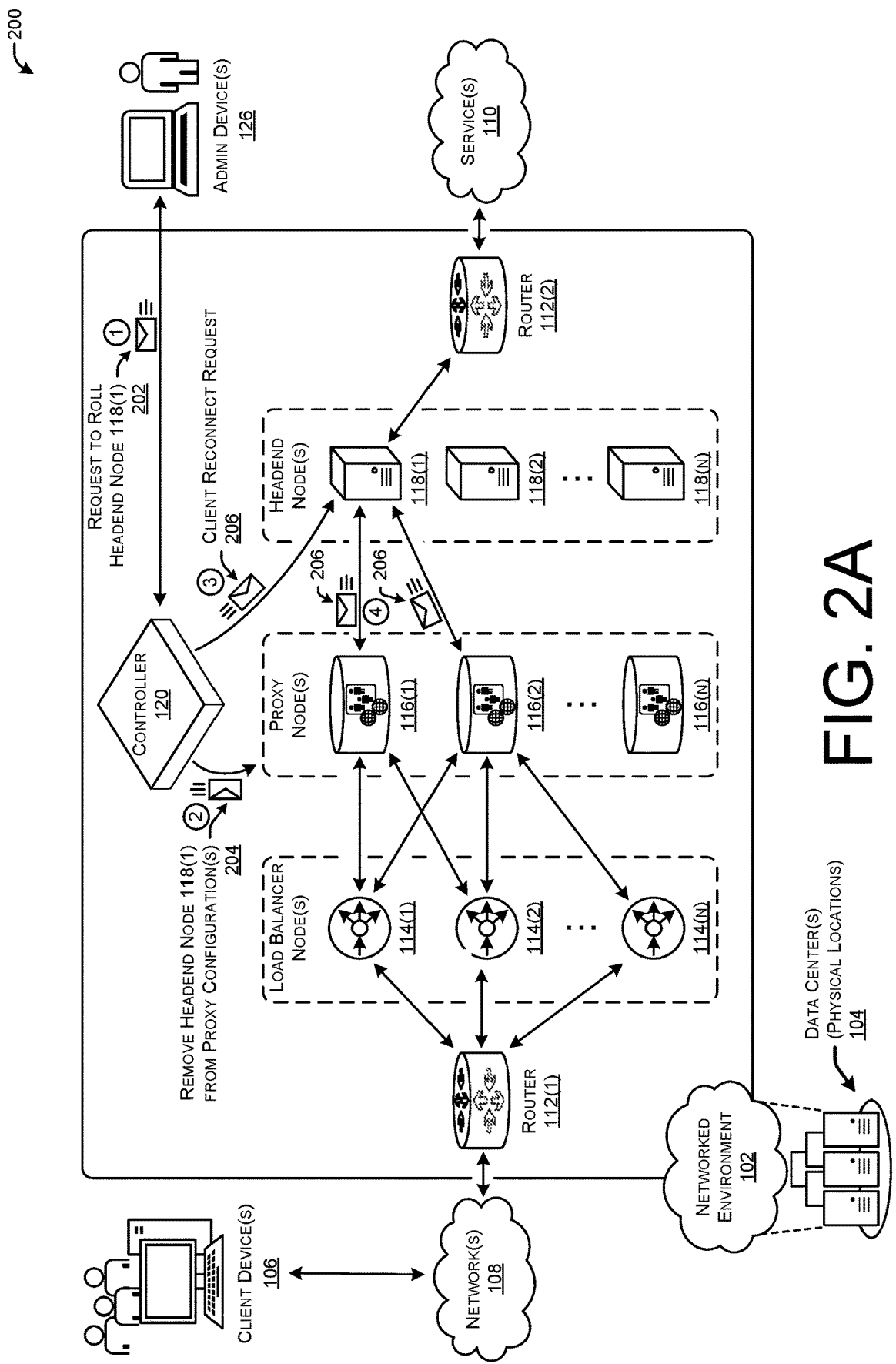
FIGS. 2A-2C collectively illustrate an example process that may be performed by the various devices of the networked environment to roll a headend node.
Figure 2B:
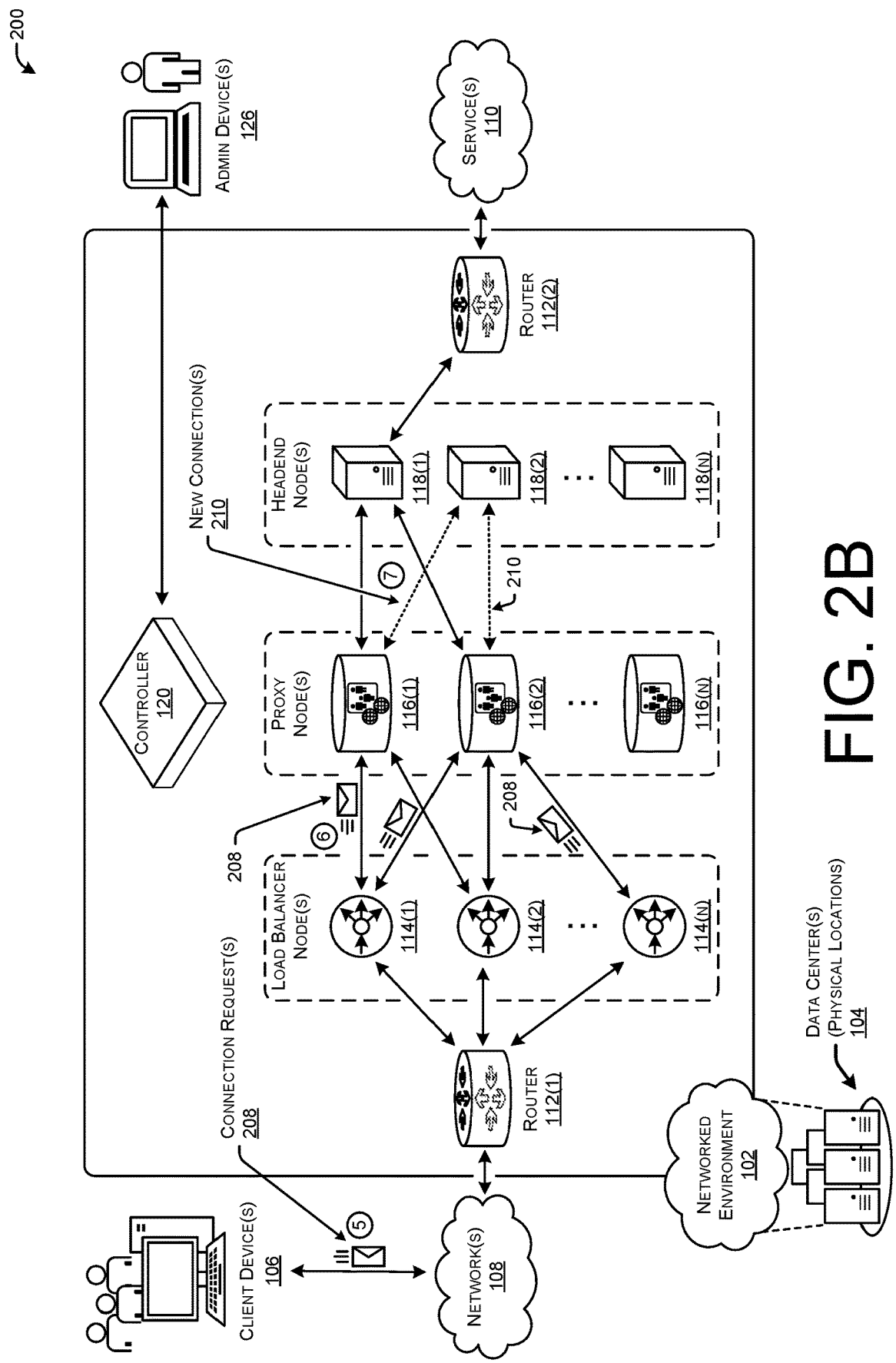
Figure 2C:
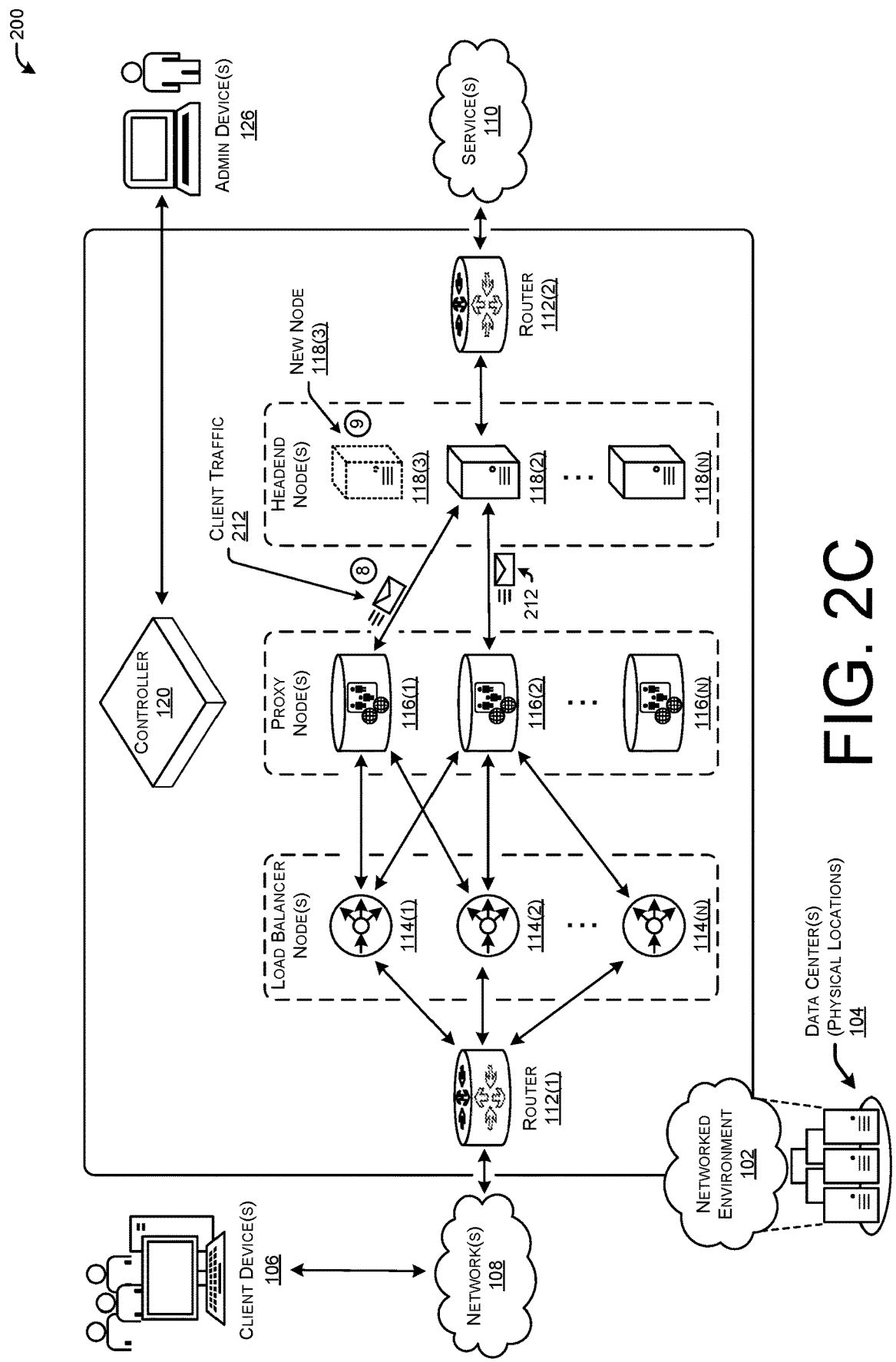

FIGS. 2A-2C collectively illustrate an example process 200 that may be performed by the various devices of the networked environment 102 to roll the headend node 118(1). The process 200 begins at "1," in which the controller 124 receives a request 202 to roll the headend node 118(1) from the one or more admin device(s) 126.

At "2," based at least in part on receiving the request 202 to roll the headend node 118(1), the controller 124 causes removal of the headend node 118(1) from the configurations of the proxy nodes 116. For instance, the controller 124 may send a request 204 to the proxy nodes 116 to cause the proxy nodes to stop sending new connections to the headend node 118(1). In this way, new connection requests may be "steered around" headend node 118(1) to a second headend node 118, such as the headend node 118(2), while traffic of existing connections may still be sent to the headend node 118(1) (as illustrated in FIG. 2B).

At "3," the controller 124 may cause the headend node 118(1) to send one or more reconnection request(s) 206 to the client devices 106 that are connected to the headend node 118(1). For instance, the controller 124 may send the reconnect request 206 to the headend node 118(1), and, at "4," the headend node 118(1) may forward the reconnect request 206 to the client devices 106. As another example, the controller 124 may send an indication to the headend node 118(1) indicating that the reconnect request 206 is to be generated and/or sent by the headend node 118(1). The reconnect request 206 may prompt the client device to establish a new connection. The reconnect request 206 may include an indication of a hostname, IP address, DNS address, and/or the like that the client device(s) 106 are to use to establish new connections.

With reference to FIG. 2B, at "5," the client device(s) 106, in response to receiving the reconnect request(s) 206, may respond to the reconnect request(s) 206 and send one or more connection request(s) 208. The connection request(s) 208 may be forwarded by the edge router 112(1) and the load balancer nodes 114 to the proxy nodes 116. Upon the proxy nodes 116 receiving the connection request(s) 208 at "6," the proxy nodes 116 may forward the connection requests(s) 208 to the headend node 118(2), or another headend node 118 other than the headend node 118(1) because the headend node 118(1) has been removed from the proxy node 116 configurations. At "7," the new connections 210 (shown in dashed lines) are established with the headend node 118(2) while the existing connections (shown in solid lines) with the headend node 118(1) remain operational.

With reference to FIG. 2C, based at least in part on the new connections 210 being established, at "8," client traffic 212 may be sent to the headend node 118(2). Additionally, based at least in part on determining that the new connections 210 have been established, at "9," the headend node 118(1) may be rolled (e.g., taken offline and replaced with a new headend node instance 118(3)). In some examples, the old connections may additionally be removed (as shown) based at least in part on establishing the new connections 210 such that the client traffic 212 can be sent to the headend node 118(2).

Figure 3A:
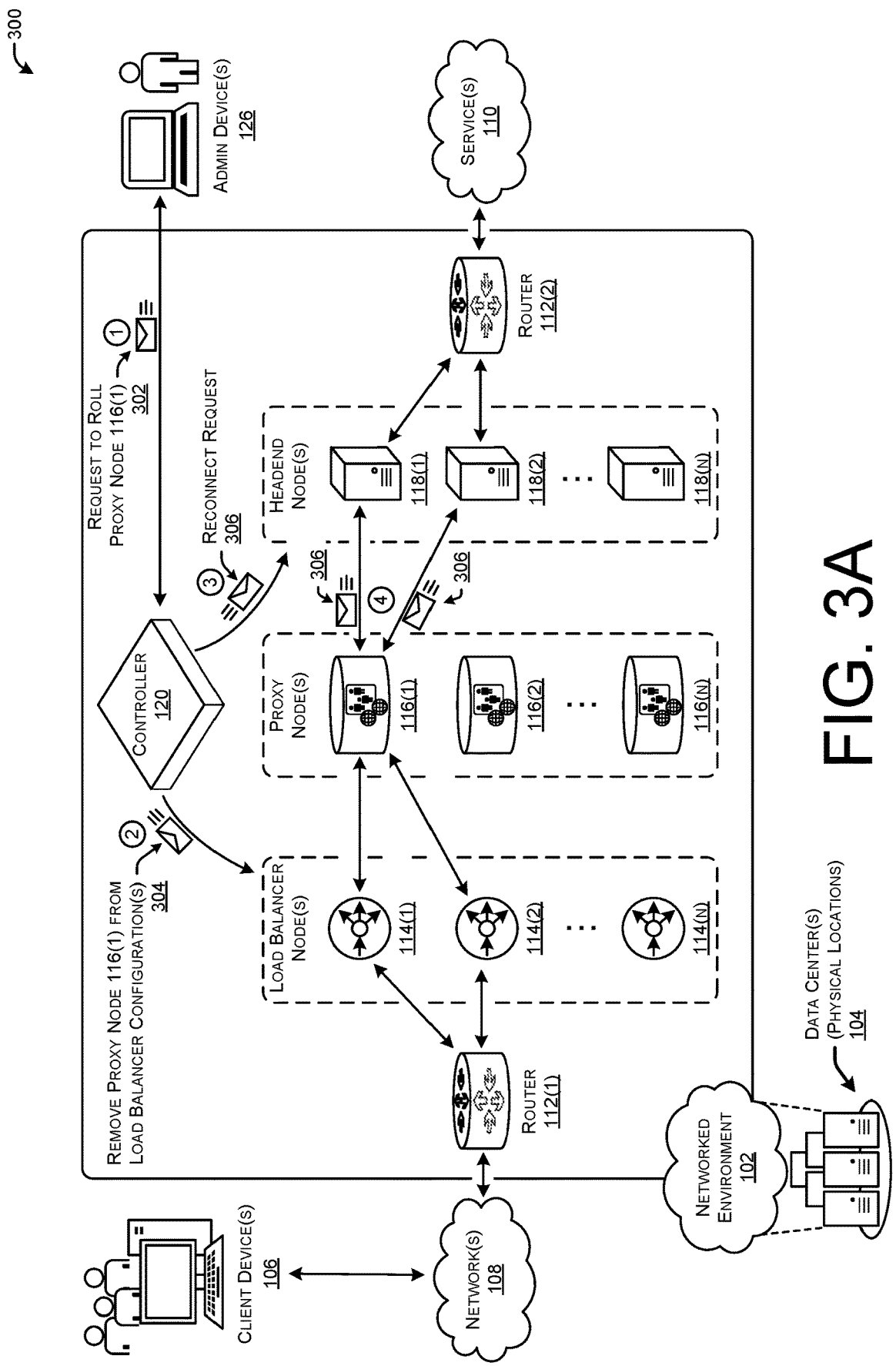
FIGS. 3A-3C collectively illustrate an example process that may be performed by the various devices of the networked environment to roll a proxy node.
Figure 3B:
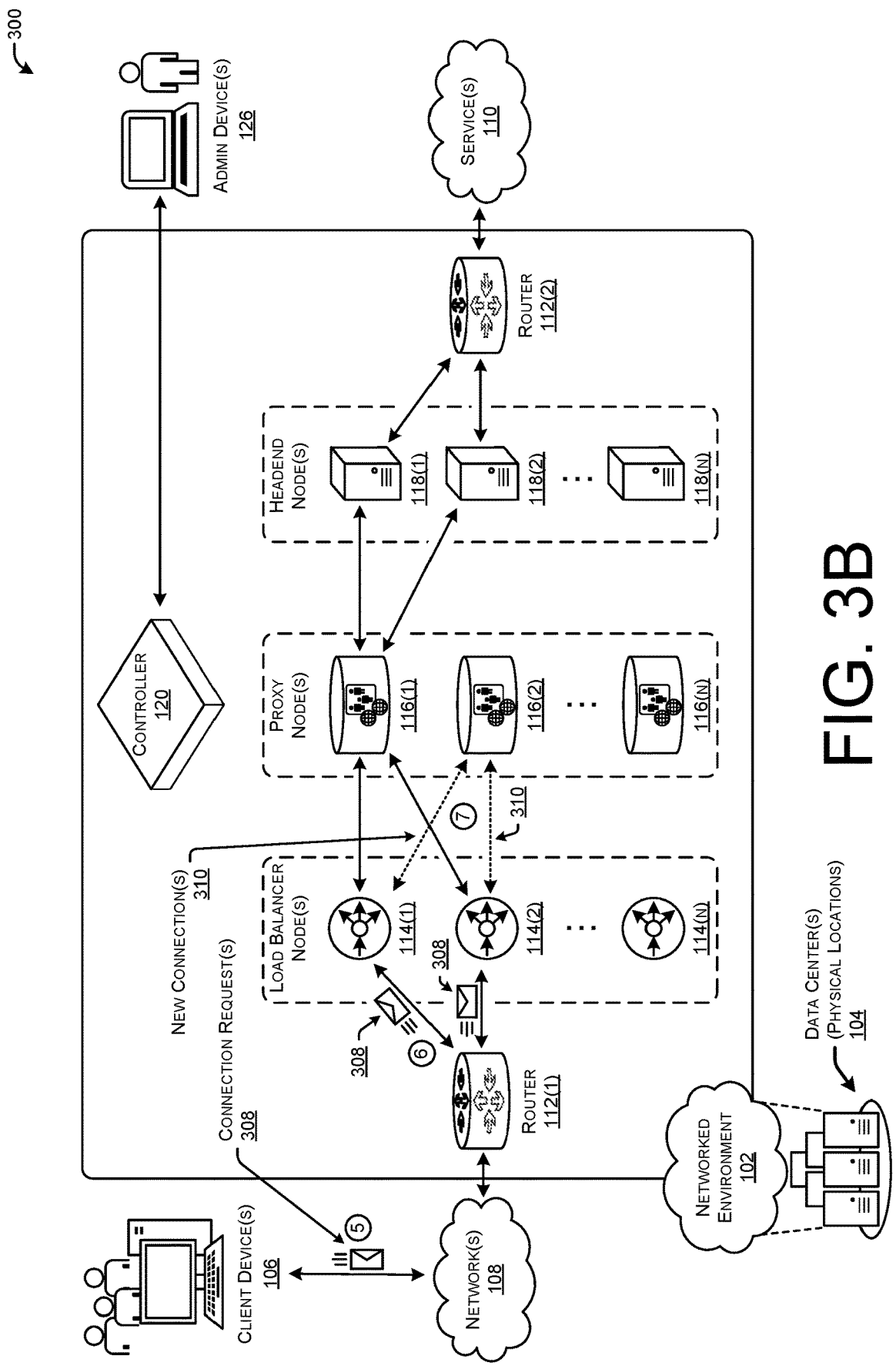
Figure 3C:
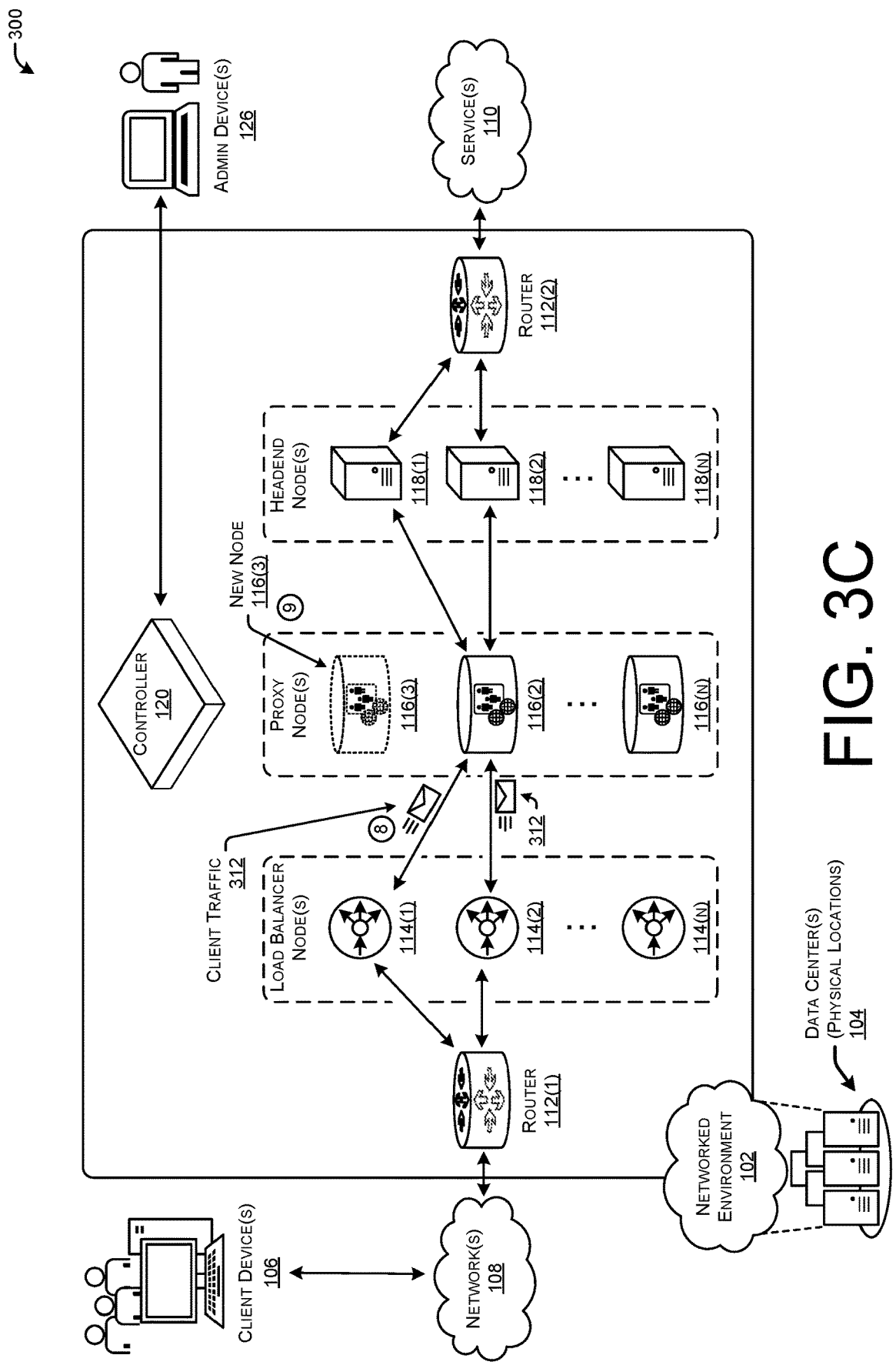

FIGS. 3A-3C collectively illustrate an example process 300 that may be performed by the various devices of the networked environment 102 to roll the proxy node 116(1). The process 300 begins at "1," in which the controller 124 receives a request 302 to roll the proxy node 116(1) from the one or more admin device(s) 126.

At "2," based at least in part on receiving the request 302 to roll the proxy node 118(1), the controller 124 causes removal of the proxy node 116(1) from the configurations of the load balancer nodes 114. For instance, the controller 124 may send a request 304 to the load balancer nodes 114 to cause the load balancer nodes 114 to stop sending new connections to the proxy node 116(1). In this way, the load balancers 114 may "steer" new connection requests around proxy node 116(1) to a second proxy node 116, such as the proxy node 116(2), while traffic of existing connections may still be sent to the proxy node 116(1) (as illustrated in FIG. 3B).

At "3," the controller 124 may cause the headend nodes 118 to send one or more reconnection request(s) 306 to the client devices 106 that are connected through (e.g., tunneled through) the proxy node 116(1). For instance, the controller 124 may send an indication to the headend nodes 118 indicating that the reconnect request 306 is to be generated and/or sent. The headend nodes 118 may identify or otherwise determine which connected client devices 106 have connections through the proxy node 116(1) and, at "4," the headend nodes 118 may send the reconnection requests 306 to the client devices 106. The reconnect requests 306 may prompt the client devices 106 to establish new connections.

The reconnect requests 306 may include an indication of a hostname, IP address, DNS address, and/or the like that the client device(s) 106 are to use to establish new connections.

With reference to FIG. 3B, at "5," the client device(s) 106, in response to receiving the reconnect request(s) 306, may respond to the reconnect request(s) 306 and send one or more connection request(s) 308. The connection request(s) 308 may at "6," be forwarded by the edge router 112(1) to the load balancer nodes 114. Upon the load balancer nodes 114 receiving the connection request(s) 308, the load balancer nodes 114 may forward the connection requests(s) 308 to the proxy node 116(2), or another proxy node 116 other than the proxy node 116(1) because the proxy node 116(1) has been removed from the load balancer node 114 configurations. At "7," the new connections 310 (shown in dashed lines) are established with the proxy node 116(2) while the existing connections (shown in solid lines) with the proxy node 116(1) remain operational.

With reference to FIG. 3C, based at least in part on the new connections 310 being established, at "8," client traffic 312 may be sent to the proxy node 116(2). Additionally, based at least in part on determining that the new connections 310 have been established, at "9," the proxy node 116(1) may be rolled (e.g., taken offline and replaced with a new proxy node instance 116(3)). In some examples, the old connections may additionally be removed (as shown) based at least in part on establishing the new connections such that the client traffic 312 can be sent through the proxy node 116(2).

Figure 4:
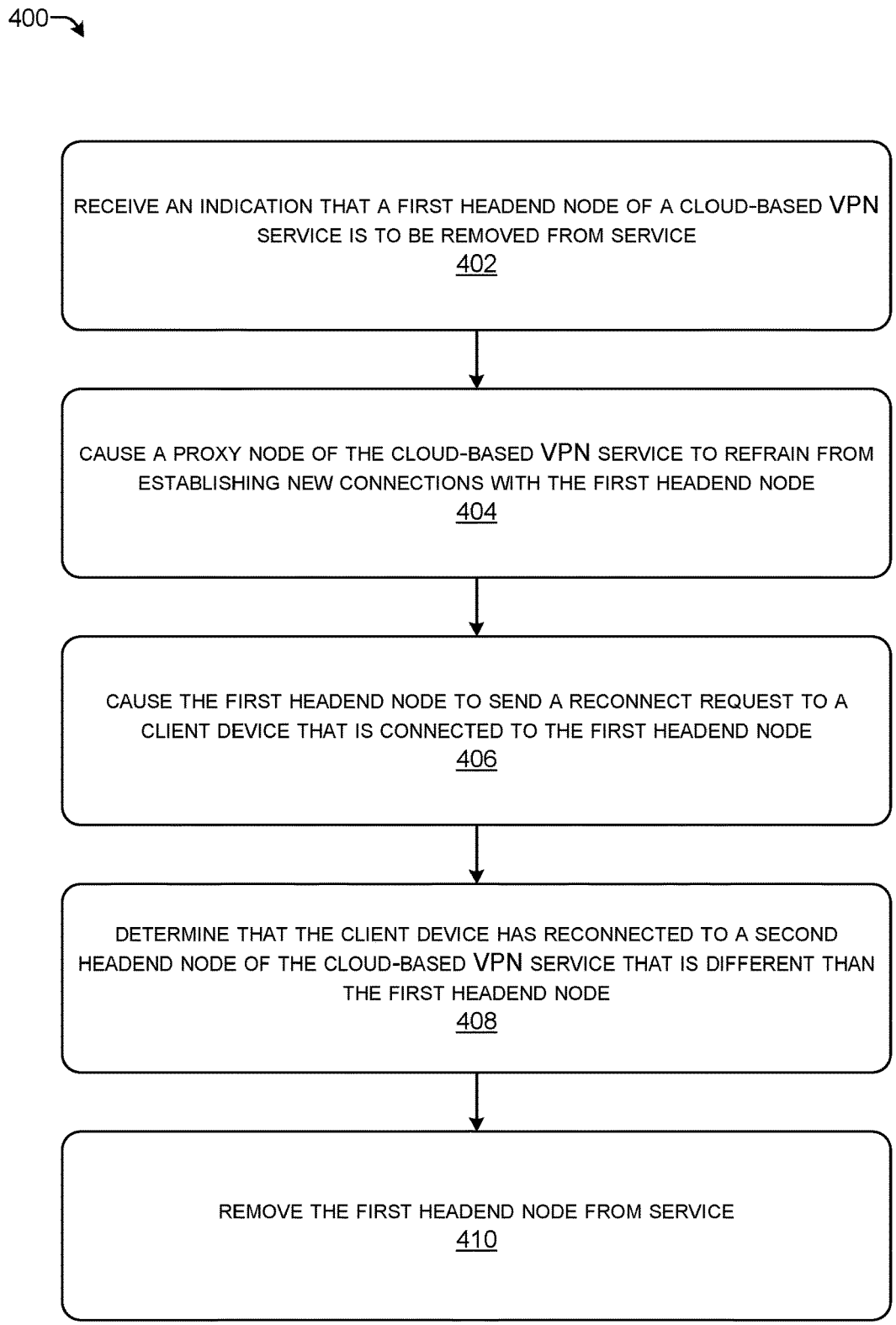
FIG. 4 illustrates a logic flow diagram of an example method associated with rolling a headend node of a cloud-based virtual private network headend service.
Figure 5:
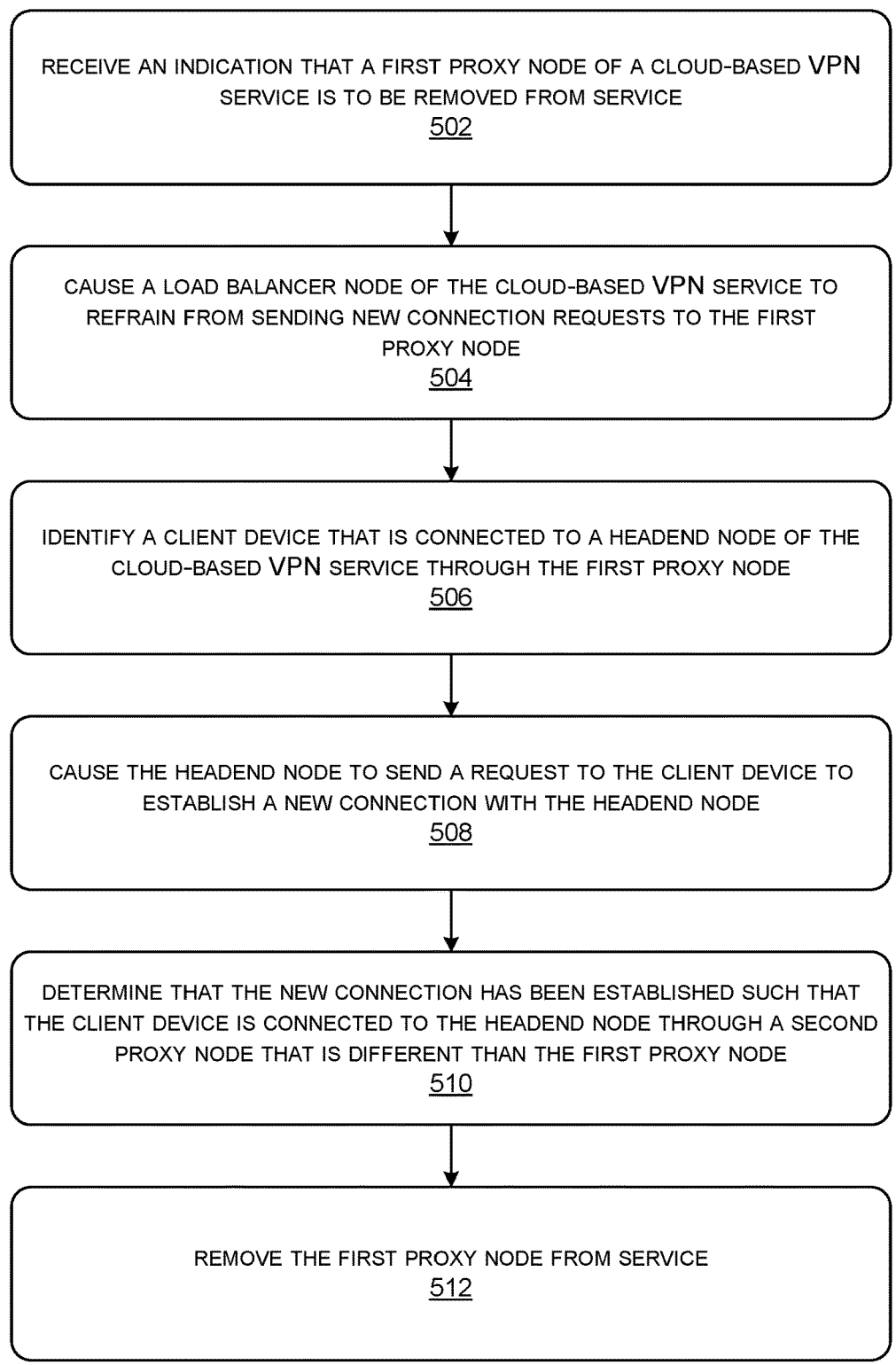
FIG. 5 illustrates a logic flow diagram of an example method associated with rolling a proxy node of a cloud-based virtual private network headend service.
Figure 6:
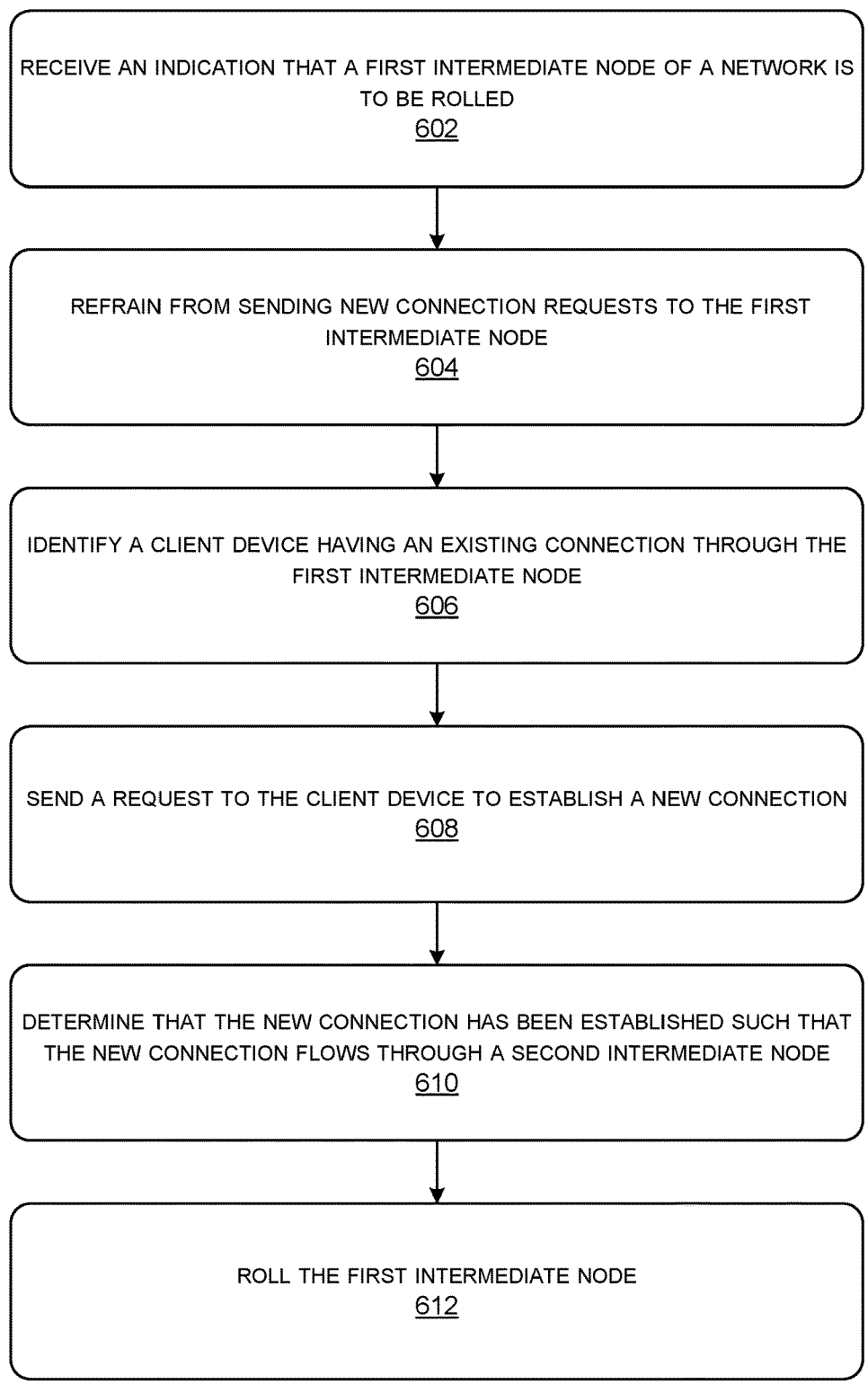
FIG. 6 illustrates a logic flow diagram of an example method associated with rolling an intermediate node of a cloud-based virtual private network headend service.

FIGS. 4, 5, and 6 illustrate logic flow diagrams of various example methods 400, 500, and 600 associated with the technologies presented herein for load balancing encrypted traffic based on SPI values. The logical operations described herein with respect to FIGS. 4, 5, and 6 may be implemented (1) as a sequence of computer-implemented acts or program modules running on a computing system and/or (2) as interconnected machine logic circuits or circuit modules within a computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4, 5, and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a logic flow diagram of an example method 400 associated with rolling a headend node of a cloud-based virtual private network headend service. The method 400 begins at operation 402, which includes receiving an indication that a first headend node of a cloud-based VPN service is to be removed from service. For instance, the controller 120 may receive the indication from the admin device(s) 126, the indication indicating that the headend node 118(1) is to be removed from service.

At operation 404, the method 400 includes causing a proxy node of the cloud-based VPN service to refrain from establishing new connections with the first headend node. For instance, the controller 120 may cause the proxy nodes 116 to refrain from establishing new connections with the headend node 118(1).

At operation 406, the method 400 includes causing the first headend node to send a reconnect request to a client device that is connected to the first headend node. For instance, the controller 120 may cause the headend node 118(1) to send the reconnect request to the client device 106.

At operation 408, the method 400 includes determining that the client device has reconnected to a second headend node of the cloud-based VPN service that is different than the first headend node. For instance, the controller 120 may determine that the client device 106 has reconnected to the headend node 118(2).

At operation 410, the method 400 includes removing the first headend node from service. For instance, the controller 120 may remove the first headend node 118(1) from service, as well as, in some examples, deploy a new or updated headend node 118(3) in place of the headend node 118(1).

FIG. 5 illustrates a logic flow diagram of an example method 500 associated with rolling a proxy node of a cloud-based virtual private network headend service. The method 500 begins at operation 502, which includes receiving an indication that a first proxy node of a cloud-based VPN service is to be removed from service. For instance, the controller 120 may receive the indication that the first proxy node 116(1) is to be removed from service.

At operation 504, the method 500 includes causing a load balancer node of the cloud-based VPN service to refrain from sending new connection requests to the first proxy node. For instance, the controller 120 may cause the load balancer nodes 114 to refrain from sending the new connection requests to the first proxy node 116(1).

At operation 506, the method 500 includes identifying a client device that is connected to a headend node of the cloud-based VPN service through the first proxy node. For instance, the controller 120 or the headend nodes 118 may identify one or more client devices 106 that are connected through the first proxy node 116(1).

At operation 508, the method 500 includes causing the headend node to send a request to the client device to establish a new connection with the headend node. For instance, the controller 120 may cause the headend nodes 118 to send the requests to the client devices 106 to establish the new connections.

At operation 510, the method 500 includes determining that the new connection has been established such that the client device is connected to the headend node through a second proxy node that is different than the first proxy node. For instance, the controller 120 may determine that the new connection has been established such that the client device 106 is connected to the headend nodes 118 through the second proxy node 116(2).

At operation 512, the method 500 includes removing the first proxy node from service. For instance, the controller 120 may remove the first proxy node 116(1) from service, as well as, in some instances, deploy a new or updated proxy node 116(3) in place of the first proxy node 116(1).

FIG. 6 illustrates a logic flow diagram of an example method 600 associated with rolling an intermediate node of a cloud-based virtual private network headend service. The method 600 begins at operation 602, which includes receiving an indication that a first intermediate node of a network is to be rolled. For instance, the controller 120 may receive the indication that one of the proxy nodes 116, load balancer nodes 114, or headend nodes 118 is to be rolled.

At operation 604, the method 600 includes refraining from sending new connection requests to the first intermediate node. For instance, the load balancer nodes 114 may refrain from sending new connection requests to a specific proxy node (e.g., 116(1)) of the proxy nodes 116, or the proxy nodes 116 may refrain from sending new connection requests to a specific headend node (e.g., 118(1)) of the headend nodes 118. Additionally, the router 112(1) may refrain from sending new connection requests to a specific load balancer (e.g., 114(1)) of the load balancer nodes 114.

At operation 606, the method 600 includes identifying a client device having an existing connection through the first intermediate node (e.g., 114(1), 116(1), or 118(1)). For instance, the client device 106 may be identified as having an existing connection through the specific load balancer node 114(1), proxy node 116(1), or headend node 118(1).

At operation 608, the method 600 includes sending a request to the client device to establish a new connection. For instance, the headend node that the client device 106 is connected to may send the request for the new connection to be established.

At operation 610, the method 600 includes determining that the new connection has been established such that the new connection flows through a second intermediate node. For instance, the controller 120 may determine that the new connection has been established such that the new connection flows through the second intermediate node (e.g., load balancer node 114(2), proxy node 116(2), or headend node 118(2)). At operation 612, the method 600 includes rolling the first intermediate node.

Figure 7:
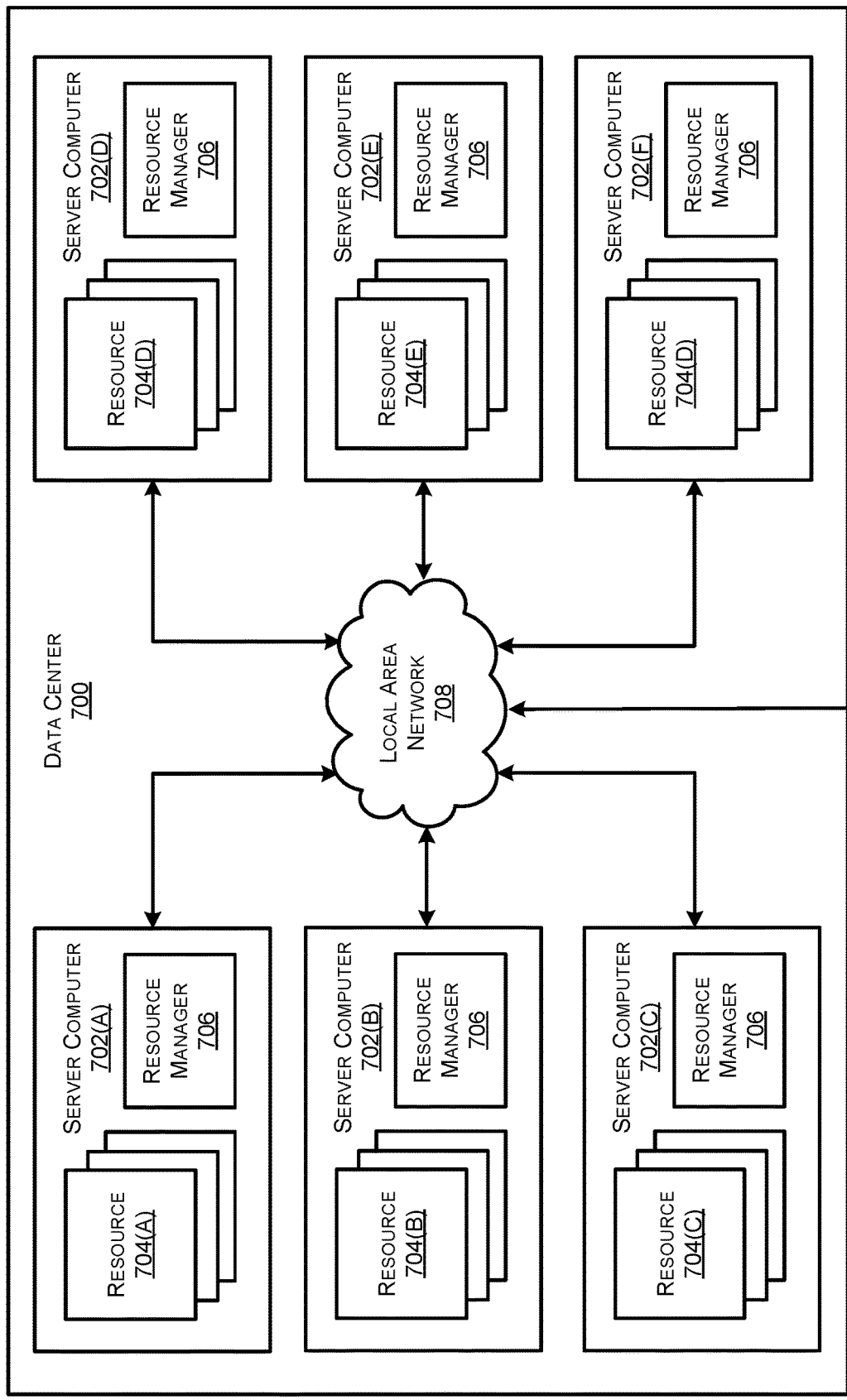
FIG. 7 is a computing system diagram illustrating an example configuration of a data center that can be utilized to implement aspects of the technologies disclosed herein.

FIG. 7 is a computing system diagram illustrating an example configuration of a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, any type of networked device or node described herein. Although described as servers, the server computers 702 may comprise any type of networked device, such as servers, switches, routers, hubs, bridges, gateways, modems, repeaters, access points, load balancers, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, security, packet inspection, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate local area network (LAN) 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein. In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
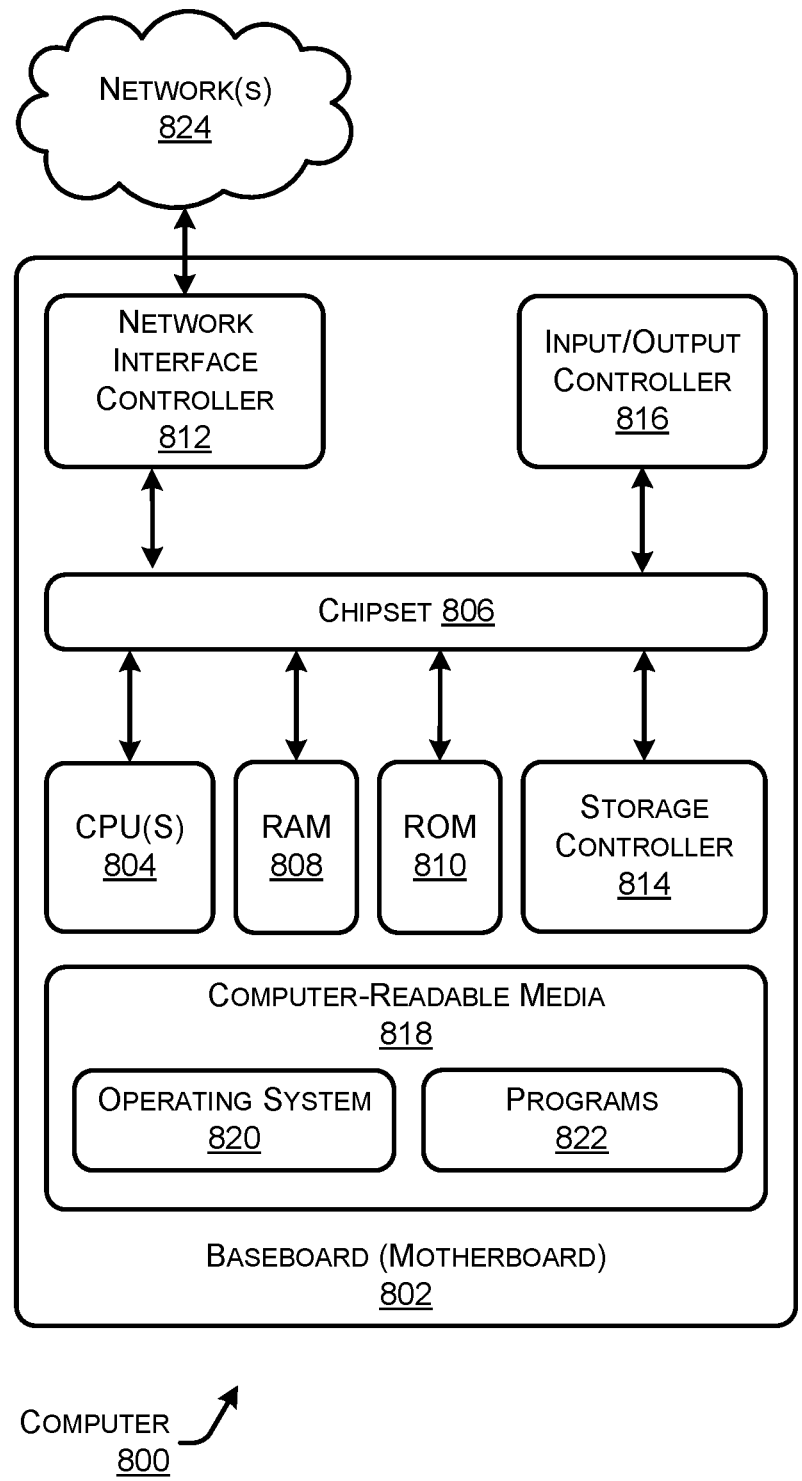
FIG. 8 illustrates a schematic view of an example computer-hardware architecture for implementing a network node and/or device, such as a load balancer, proxy node, headend node, etc. that can be utilized to implement aspects of the various technologies presented herein.

FIG. 8 illustrates a schematic view of an example computer-hardware architecture for implementing a network node and/or device, such as a load balancer, control node, data node, etc., that can be utilized to implement aspects of the various technologies presented herein. The computer architecture shown in FIG. 8 illustrates a conventional server computer, network device, workstation, desktop computer, laptop, tablet, network appliance, e-reader, smartphone, and/or other computing device, and can be utilized to execute any of the software components presented herein. The computer 800 may comprise networked devices such as servers, switches, routers, hubs, bridges, gateways, modems, repeaters, access points, load balancers, etc.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network(s) 108 and/or the network(s) 824. The chipset 806 can include functionality for providing network connectivity through a NIC 812, such as a gigabit Ethernet adapter. The NIC 812 is capable of connecting the computer 800 to other computing devices over the network. It should be appreciated that multiple NICs 812 can be present in the computer 800, connecting the computer to other types of networks and remote computer systems. In some examples, the NIC 812 may be configured to perform at least some of the techniques described herein, and may include components for performing the techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the system-architecture 80 and or any components included therein, may be supported by one or more devices similar to computer 800. Stated otherwise, some or all of the operations performed by the system-architecture 80, and or any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes and methods described above with regard to FIGS. 1-6. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As described herein, the computer 800 may comprise one or more of data nodes, control nodes, firewall nodes, edge routers, and/or key-value stores. The computer 800 may include one or more hardware processors 804 (processors) configured to execute one or more stored instructions. The processor(s) 804 may comprise one or more cores. Further, the computer 800 may include one or more network interfaces (e.g., NIC 812) configured to provide communications between the computer 800 and other devices over a network, such as the networks 108 and 824. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for orchestrated reconnect and the transparent rolling of nodes in a cloud-delivered headend service without disrupting client traffic or making users aware of the various nodes in the system being redeployed or taken out of service.

While the invention is described with respect to the specific examples, it is to be understood that the scope of the invention is not limited to these specific examples. For instance, while many of the examples are described with respect to IPsec protocols, it should be understood that the techniques described are applicable to other protocols. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to perform operations comprising:
determining to refrain from servicing virtual private network (VPN) connection requests through a first intermediate node to reach termination nodes of a cloud-based VPN headend service;
sending, to a client device that has an existing VPN connection with a first termination node that passes through the first intermediate node, an indication to cause the client device to establish a new VPN connection without terminating the existing VPN connection;
causing the new VPN connection to be established between the client device and the first termination node or a second termination node through a second intermediate node; and
subsequent to the client device establishing the new VPN connection through the second intermediate node, removing the first intermediate node from service.

2. The system of claim 1, wherein the indication to cause the client device to establish the new VPN connection includes at least one of a hostname or an internet protocol (IP) address that is associated with the second intermediate node.

3. The system of claim 1, wherein:
the indication to establish the new VPN connection is sent to each client device of multiple client devices that have existing connections passing through the first intermediate node, and
removing the first intermediate node from service is based at least in part on determining that each one of the multiple client devices have established new connections through other intermediate nodes that are different from the first intermediate node.

4. The system of claim 1, the operations further comprising at least one of:
updating the first intermediate node with a new version of software while the first intermediate node is removed from service; or
deploying the second intermediate node to replace the first intermediate node based at least in part on the first intermediate node being removed from service.

5. The system of claim 4, wherein the first intermediate node is at least one of a load balancer node, a proxy node, or a headend node of the cloud-based VPN headend service.

6. The system of claim 1, wherein the first intermediate node is associated with a first datacenter and the second intermediate node is associated with a second datacenter, the second datacenter located in a different geographical location than the first datacenter.

7. The system of claim 1, the operations further comprising:
receiving, at a proxy node of the cloud-based VPN headend service, a connection request from the client device, the connection request indicating a request for the new VPN connection; and
based at least in part on the first intermediate node being removed from service, sending, from the proxy node, the connection request to the second intermediate node.

8. A method comprising:
determining to refrain from servicing virtual private network (VPN) connection requests through a first intermediate node to reach termination nodes of a cloud-based VPN headend service;

sending, to a client device that has an existing VPN connection with a first termination node that passes through the first intermediate node, an indication to cause the client device to establish a new VPN connection without terminating the existing VPN connection;

causing the new VPN connection to be established between the client device and the first termination node or a second termination node through a second intermediate node; and subsequent to the client device establishing the new VPN connection through the second intermediate node, removing the first intermediate node from service.

9. The method of claim 8, wherein the indication to cause the client device to establish the new VPN connection includes at least one of a hostname or an internet protocol (IP) address that is associated with the second intermediate node.

10. The method of claim 8, wherein:
the indication to establish the new VPN connection is sent to each client device of multiple client devices that have existing connections passing through the first intermediate node, and
removing the first intermediate node from service is based at least in part on determining that each one of the multiple client devices have established new connections through other intermediate nodes that are different from the first intermediate node.

11. The method of claim 8, further comprising at least one of:
updating the first intermediate node with a new version of software while the first intermediate node is removed from service; or
deploying the second intermediate node to replace the first intermediate node based at least in part on the first intermediate node being removed from service.

12. The method of claim 11, wherein the first intermediate node is at least one of a load balancer node, a proxy node, or a headend node of the cloud-based VPN headend service.

13. The method of claim 8, wherein the first intermediate node is associated with a first datacenter and the second intermediate node is associated with a second datacenter, the second datacenter located in a different geographical location than the first datacenter.

14. The method of claim 8, further comprising:
receiving, at a proxy node of the cloud-based VPN headend service, a connection request from the client device, the connection request indicating a request for the new VPN connection; and
based at least in part on the first intermediate node being removed from service, sending, from the proxy node, the connection request to the second intermediate node.

15. One or more non-transitory computer-readable media storing computer executable instructions that, when executed by one or more processors, cause the one or more processors to perform operations comprising:
determining to refrain from servicing virtual private network (VPN) connection requests through a first intermediate node to reach termination nodes of a cloud-based VPN headend service;
sending, to a client device that has an existing VPN connection with a first termination node that passes through the first intermediate node, an indication to cause the client device to establish a new VPN connection without terminating the existing VPN connection;
causing the new VPN connection to be established between the client device and the first termination node or a second termination node through a second intermediate node; and
subsequent to the client device establishing the new VPN connection through the second intermediate node, removing the first intermediate node from service.

16. The one or more non-transitory computer-readable media of claim 15, wherein the indication to cause the client device to establish the new VPN connection includes at least one of a hostname or an internet protocol (IP) address that is associated with the second intermediate node.

17. The one or more non-transitory computer-readable media of claim 15, wherein:
the indication to establish the new VPN connection is sent to each client device of multiple client devices that have existing connections passing through the first intermediate node, and
removing the first intermediate node from service is based at least in part on determining that each one of the multiple client devices have established new connections through other intermediate nodes that are different from the first intermediate node.

18. The one or more non-transitory computer-readable media of claim 15, the operations further comprising at least one of:
updating the first intermediate node with a new version of software while the first intermediate node is removed from service; or
deploying the second intermediate node to replace the first intermediate node based at least in part on the first intermediate node being removed from service.

19. The one or more non-transitory computer-readable media of claim 18, wherein the first intermediate node is at least one of a load balancer node, a proxy node, or a headend node of the cloud-based VPN headend service.

20. The one or more non-transitory computer-readable media of claim 15, wherein the first intermediate node is associated with a first datacenter and the second intermediate node is associated with a second datacenter, the second datacenter located in a different geographical location than the first datacenter.

21. The system of claim 1, the operations further comprising:
modifying a configuration of a load balancer disposed between client devices and termination nodes to cause the load balancer to refrain from sending new VPN connections to the first intermediate node; and
routing, by the load balancer, the new VPN connection to the second intermediate node based at least in part on configuration being modified.

22. The system of claim 1, wherein:
sending the indication to cause the client device to establish the new VPN connection comprises sending, by the first termination node, a reconnect request to the client device, wherein the reconnect request causing the client device to establish the new VPN connection.

* * * * *